US012705900B2

(12) United States Patent
Martinez Gonzalez et al.

(10) Patent No.: US 12,705,900 B2
(45) Date of Patent: Aug. 11, 2026

(54) SYSTEM AND METHOD FOR CREATING ENVIRONMENTAL MODEL FOR INTELLIGENT INTERSECTION FUNCTIONS

(71) Applicant: Continental Automotive Systems, Inc., Auburn Hills, MI (US)

(72) Inventors: Pablo Arturo Martinez Gonzalez, San Luis Potosi (MX); Ganesh Adireddy, Bloomfield Hills, MI (US); Naveen Chilukoti, Troy, MI (US)

(73) Assignee: AUMOVIO Systems, Inc., Auburn Hills, MI (US)

( * ) Notice: Subject to any disclaimer, the term of this patent is extended or adjusted under 35 U.S.C. 154(b) by 284 days.

(21) Appl. No.: 18/708,037

(22) PCT Filed: Nov. 8, 2022

(86) PCT No.: PCT/US2022/079422
§ 371 (c)(1),
(2) Date: May 7, 2024

(87) PCT Pub. No.: WO2023/081904
PCT Pub. Date: May 11, 2023

(65) Prior Publication Data

US 2025/0014353 A1 Jan. 9, 2025

Related U.S. Application Data

(60) Provisional application No. 63/263,701, filed on Nov. 8, 2021.

(51) Int. Cl.

| | |
|---|---|
| ***G06V 20/54*** | (2022.01) |
| ***G06T 7/70*** | (2017.01) |

(Continued)

(52) U.S. Cl.
CPC ................ *G06V 20/54* (2022.01); *G06T 7/70* (2017.01); *G06V 10/764* (2022.01); (Continued)

(58) Field of Classification Search
CPC ...... G06V 20/54; G06V 10/803; G06V 40/10; G06V 10/764; G06V 2201/30196; G06T 7/70; G06T 2207/30236; G08G 1/07
See application file for complete search history.

(56) References Cited

U.S. PATENT DOCUMENTS

| | | |
|---|---|---|
| 10,388,153 B1 | 8/2019 | Swaminathan et al. |
| 10,942,256 B2 | 3/2021 | Achour et al. |

(Continued)

FOREIGN PATENT DOCUMENTS

| | | |
|---|---|---|
| CN | 102564431 A | 7/2012 |
| CN | 108196535 A | 6/2018 |

(Continued)

OTHER PUBLICATIONS

International Search Report and Written Opinion dated Mar. 1, 2023 from corresponding International patent application No. PCT/US2022/079422.

*Primary Examiner* — Stephen R Koziol
*Assistant Examiner* — Raven Simone Jones

(57) ABSTRACT

An intelligent intersection method includes receiving raw sensor data from a sensors mounted relative to a street intersection. The received raw sensor data is fused to create at least one object sensed by the sensors. An object list is created or updated with information pertaining to created object, the object list serving as an environmental model. One or more intelligent intersection functions is subsequently performed based in part upon the environmental model. The method may further include determining whether the created object is associated with first data (Continued)

defining a topology of at least one of a plurality of lanes, a crosswalk or a sidewalk corresponding to the intersection. Upon an affirmative determination that the created object is associated with the first data, the method classifies the created object as a vehicle or a pedestrian for use as an attribute of the created object in the object list.

14 Claims, 7 Drawing Sheets

(51) Int. Cl.

| | |
|---|---|
| ***G06V 10/764*** | (2022.01) |
| ***G06V 10/80*** | (2022.01) |
| ***G06V 40/10*** | (2022.01) |
| ***G08G 1/07*** | (2006.01) |

(52) U.S. Cl.

CPC ............ *G06V 10/803* (2022.01); *G06V 40/10* (2022.01); *G08G 1/07* (2013.01); *G06T 2207/30196* (2013.01); *G06T 2207/30236* (2013.01); *G06V 2201/08* (2022.01)

(56) References Cited

U.S. PATENT DOCUMENTS

| | | | | |
|---|---|---|---|---|
| 10,991,243 | B2 | 4/2021 | Raamot | |
| 2014/0195138 | A1 | 7/2014 | Stelzig et al. | |
| 2015/0002315 | A1 | 1/2015 | Box et al. | |
| 2017/0067991 | A1 | 3/2017 | Liu et al. | |
| 2020/0033153 | A1 | 1/2020 | Schneider et al. | |
| 2020/0219389 | A1* | 7/2020 | Hacker | G08G 1/0116 |
| 2021/0108926 | A1 | 4/2021 | Tran | |

FOREIGN PATENT DOCUMENTS

| | | | |
|---|---|---|---|
| CN | 109556615 | A | 4/2019 |
| CN | 110920552 | A | 3/2020 |
| CN | 112017437 | | 12/2020 |
| CN | 113022540 | A | 6/2021 |
| CN | 113160454 | A | 7/2021 |
| CN | 113255397 | A | 8/2021 |
| EP | 2807640 | A1 | 12/2014 |
| EP | 3779867 | A1 | 2/2021 |
| EP | 3832341 | A1 | 6/2021 |
| WO | 2020219303 | A1 | 10/2020 |

* cited by examiner

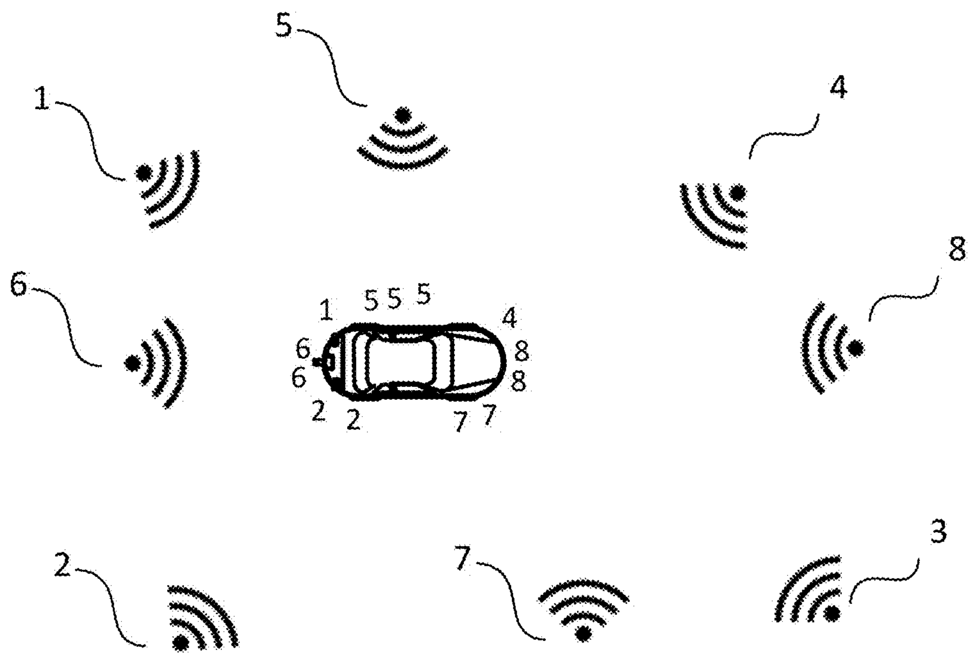
FIG. 2A
FIG. 2B
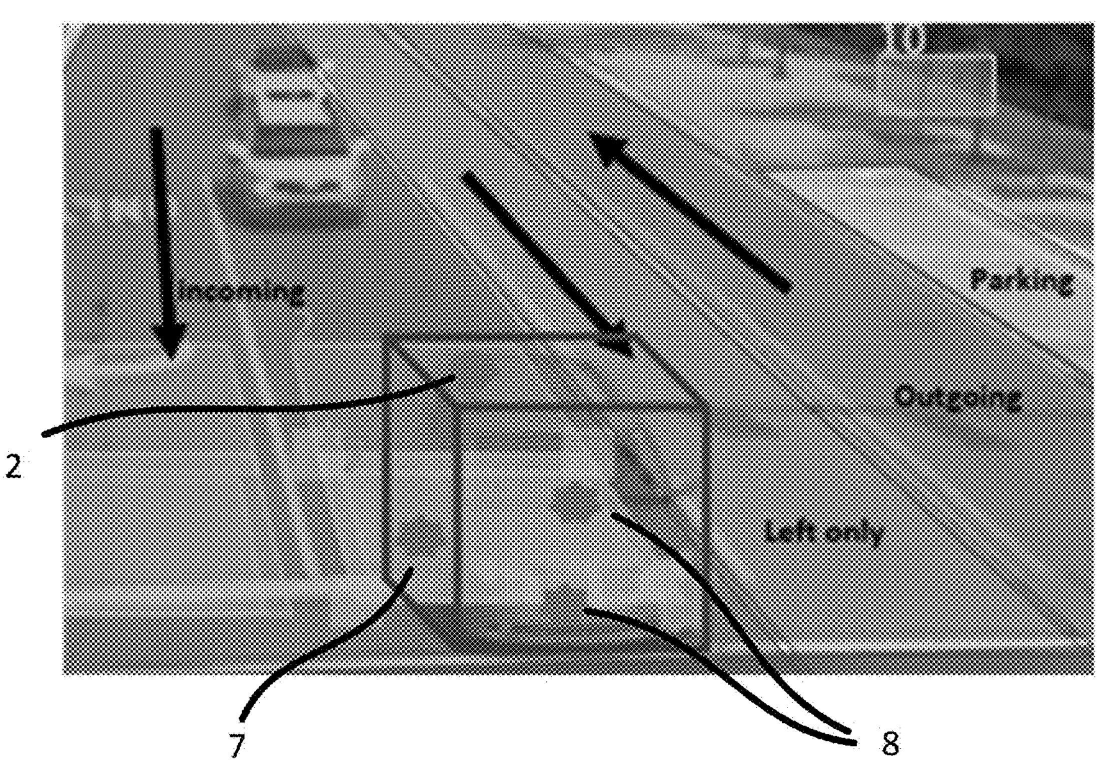

SYSTEM AND METHOD FOR CREATING ENVIRONMENTAL MODEL FOR INTELLIGENT INTERSECTION FUNCTIONS

FIELD OF INVENTION

The present invention generally relates to an intelligent intersection, and particularly to an intelligent intersection system in which objects and/or roadway users, such as pedestrians and vehicles, are sensed and classified for use in an object list forming an environmental model for the system.

BACKGROUND

Intelligent intersection systems typically perform any of a variety of functions to facilitate the safe and efficient flow of traffic by vehicles, pedestrians and cyclists passing through a street intersection. Such a system may include sensors for sensing and classifying objects in and around the intersection, and data processing hardware for performing an intelligent intersection function based upon the sensed, classified objects. Example intelligent intersection functions include controlling traffic lights at the street intersection and detecting whether a traffic accident has occurred or may likely occur. The accurate sensing and classifying of objects are important to ensure that the intelligent intersection functions are safely performed.

BRIEF DESCRIPTION OF THE DRAWINGS

Aspects of the invention will be explained in detail below with reference to exemplary embodiments in conjunction with the drawings, in which:

FIG. 2A is top view illustrating simplified radar reflections associated with a vehicle in the street intersection of FIG. 1;

FIG. 2B is a perspective view showing a three dimensional representation of the vehicle based on radar (reflection) data of FIG. 2A.

DETAILED DESCRIPTION

The following description of the example embodiments is merely exemplary in nature and is in no way intended to limit the invention, its application, or uses.

The example embodiments presented herein are generally directed to a system, software product and operating method for creating an environmental model for use by an intelligent intersection system. A central processing unit (CPU) of the intelligent intersection system receives raw radar data from a plurality of radar sensors disposed at the corresponding intersection, fuses the raw radar data to create or otherwise detect objects in the intersection, and classifies the objects by associating lane, crosswalk and sidewalk topology data of the corresponding intersection with the created objects. Created objects associated with lane topology data are given the attribute of a vehicle and created objects associated with crosswalk and/or the sidewalk topology data are given the attribute of a pedestrian. An object list is formed which includes the created objects and corresponding attributes and serves as an environmental model for performing various intelligent intersection functions by the intelligent intersection system.

Figure 1:
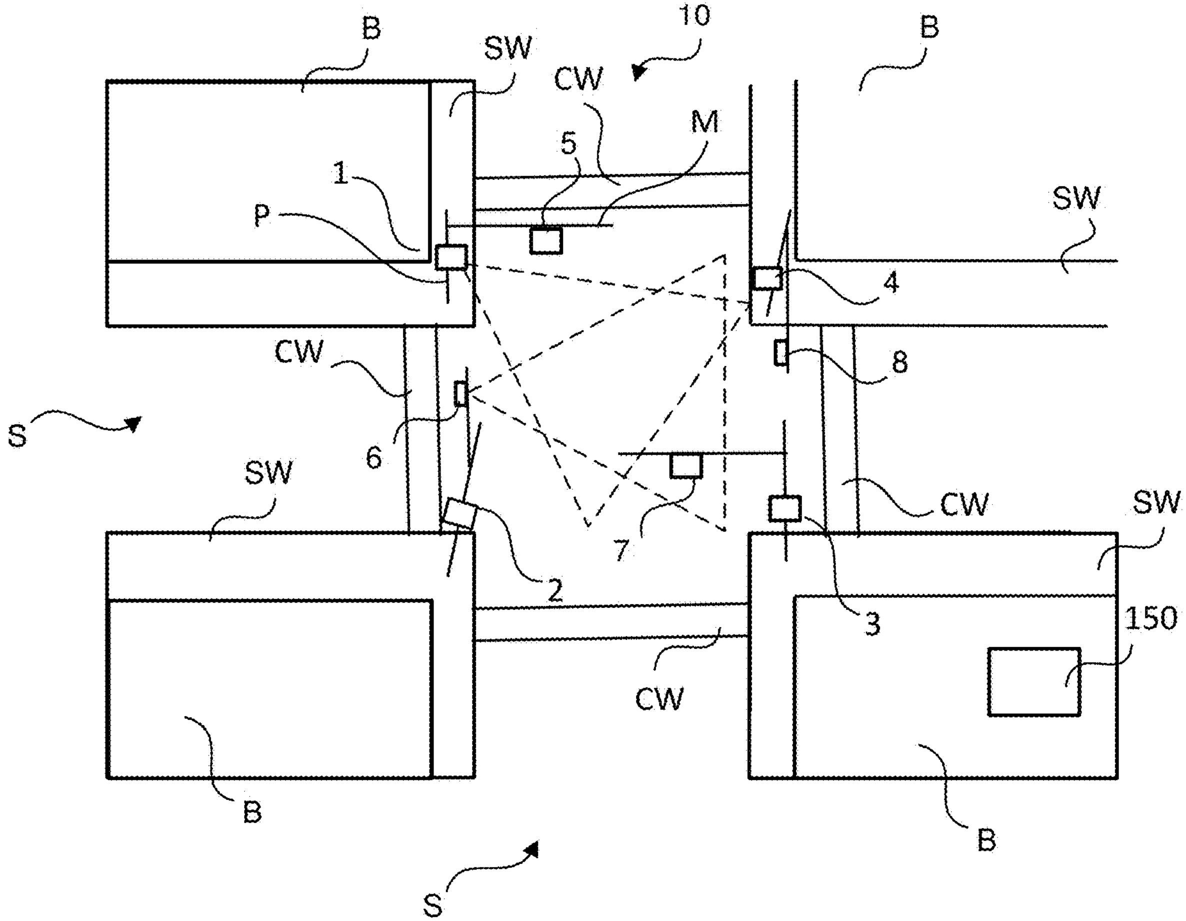
FIG. 1 is a top view of a street intersection having an intelligent intersection system according to an example embodiment.

FIG. 1 illustrates a bird's eye view of an intersection of streets S bounded by city blocks B having sidewalk/curb areas SW and crosswalks CW. A plurality of traffic lights (not shown) are disposed on masts M that are supported by poles P (only one pole P and corresponding mast M are specifically identified for reasons of clarity). An infrastructure system 10 is disposed in and around the intersection. In this example embodiment, the intelligent intersection system 10 includes a plurality of radar sensors 1-8 facing the intersection of streets S. Each radar sensor 1-4 is mounted to a distinct pole P and each radar sensor 5-8 is mounted to a distinct mast M. Each pole-mounted radar sensor 1-4 faces the center of the intersection of streets S and each mast-mounted radar sensor faces the corresponding incoming street S. The field of view of radar sensor 1 and 6 are shown in dashed lines. It is understood that more or less than eight radar sensors may be used in association with an intersection of streets, and that the radar sensors may be mounted at different locations relative to the street intersection than on the poles P and masts M as illustrated in FIG. 1.

FIG. 2A is a simplified illustration of radar reflections from a vehicle passing through the intersection of streets S. The numbers surrounding the vehicle in the drawing illustrate radar reflections associated with the corresponding radar sensor 1-8. It is understood that the actual number of reflections may be significantly more than depicted in FIG. 2. As shown, radar reflection(s) associated with radar sensor 1 reflect from locations along the rear driver side of the vehicle, the radar reflections from radar sensor 5 reflect from locations along the driver side of the vehicle, the radar reflections associated with radar sensor 6 reflect from locations along the rear of the vehicle, and radar flections associated with radar sensor 8 reflect from locations along the front of the vehicle. FIG. 2B illustrates a simplified three dimensional representation of the vehicle based upon the reflection data of FIG. 2A. This raw radar (reflection) data is used by the intelligent intersection system 10 as described below.

Figure 3:
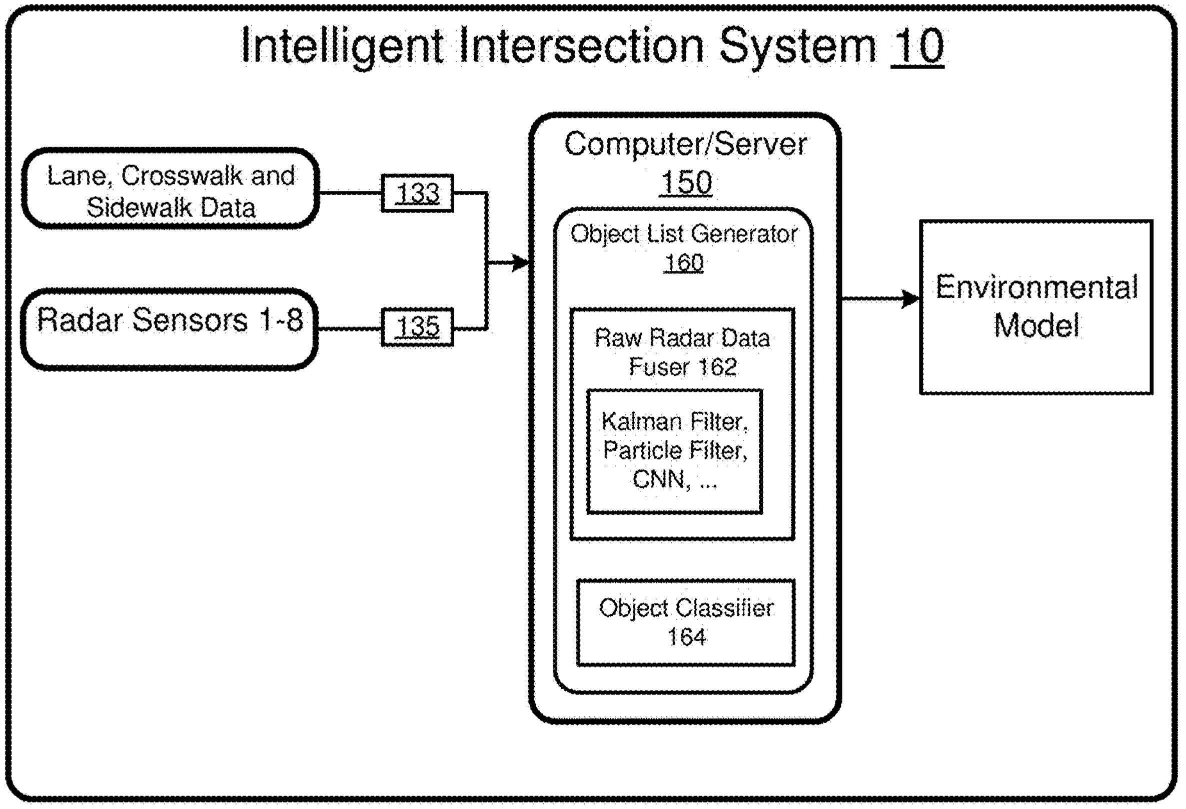
FIG. 3 is a schematic diagram of the intelligent intersection system of FIG. 1.

FIG. 3 illustrates a block diagram of the intelligent intersection system 10 according to an example embodiment. In addition to radar sensors 1-8, the system 10 includes a computer and/or server 150 (hereinafter simply "computer 150"). The computer 150 may be separate from the radar sensors 1-8 as depicted in FIG. 1. Alternatively, computer 150 may be part of one or more of the sensors 1-8. The computer 150 receives raw radar data 135 from radar sensors 1-8 and data 133 corresponding to the topology of lanes of streets S, crosswalks CW and sidewalks SW, hereinafter "lane data," "crosswalk data," and "sidewalk data," respectively. The computer 150 includes an object list generator 160 which is an algorithm executed by the computer 150 and generates or otherwise updates an object list based upon the received raw radar data, the lane data, the crosswalk data and the sidewalk data. The object list may serve as an environmental model by the computer 150 or other controller or data processing hardware in performing intelligent intersection functions. The object list generator 160 may include a raw radar data fuser module 162 which fuses the raw radar data to creates and/or detects objects, and an object classifier module 164 which classifies the created objects.

With continued reference to FIG. 3, the raw radar data fuser module 162 receives the raw radar data from each of the radar sensors 1-8 and fuses the raw radar data to create or otherwise detect one or more objects within the fields of view of the radar sensors. In one implementation, the raw radar data fuser module 162 includes a Kalman filter, such as an extended Kalman filter, for fusing the raw radar data and creating the objects in the street intersection. Alternatively, the raw radar data fuser module 162 uses a particle filter, a Bayesian Network, a convolution neural network (CNN), or a recurrent neural network (RNN) instead of a Kalman filter. In each case, the raw radar data 135 is provided as an input to the above-described filter or network which outputs an object list having therein objects in the raw radar data. In this case, the reflection data corresponding to radar sensors 1-8 for each object in or around the intersection is fused to create the object for inclusion in the object list. Each object created may include attributes including size, position, velocity and heading.

The object classifier module 164 associates the created object(s) in the object list with the lane, crosswalk and sidewalk data 133 for use in classifying the created object. In one implementation, a relatively simple check is employed: if the created object is determined to be in a lane as defined in the lane data 133, including moving in the lane, the object is classified with high probability as corresponding to a vehicle and the created object is provided with a vehicle attribute in the object list. The object classifier module 164 uses lane, crosswalk and sidewalk data as additional input for classifying the objects by influencing class probability. In one implementation, the object may be classified as a vehicle if the object is also moving in a direction that is consistent with the known direction of traffic in the corresponding lane. If the created object is determined to be in a crosswalk CW or sidewalk SW as defined in the crosswalk data or a sidewalk data, including moving in the crosswalk or sidewalk, the object is classified with high probability as corresponding to a pedestrian and the created objected is provided with a pedestrian attribute in the object list. In associating the created objects with the lane, crosswalk and sidewalk data, the objects may be relatively easily and accurately classified as a vehicle or pedestrian. It is understood that another implementation may utilize artificial intelligence and/or machine learning to classify the created objects using the lane, crosswalk and sidewalk data 133.

Figure 5:
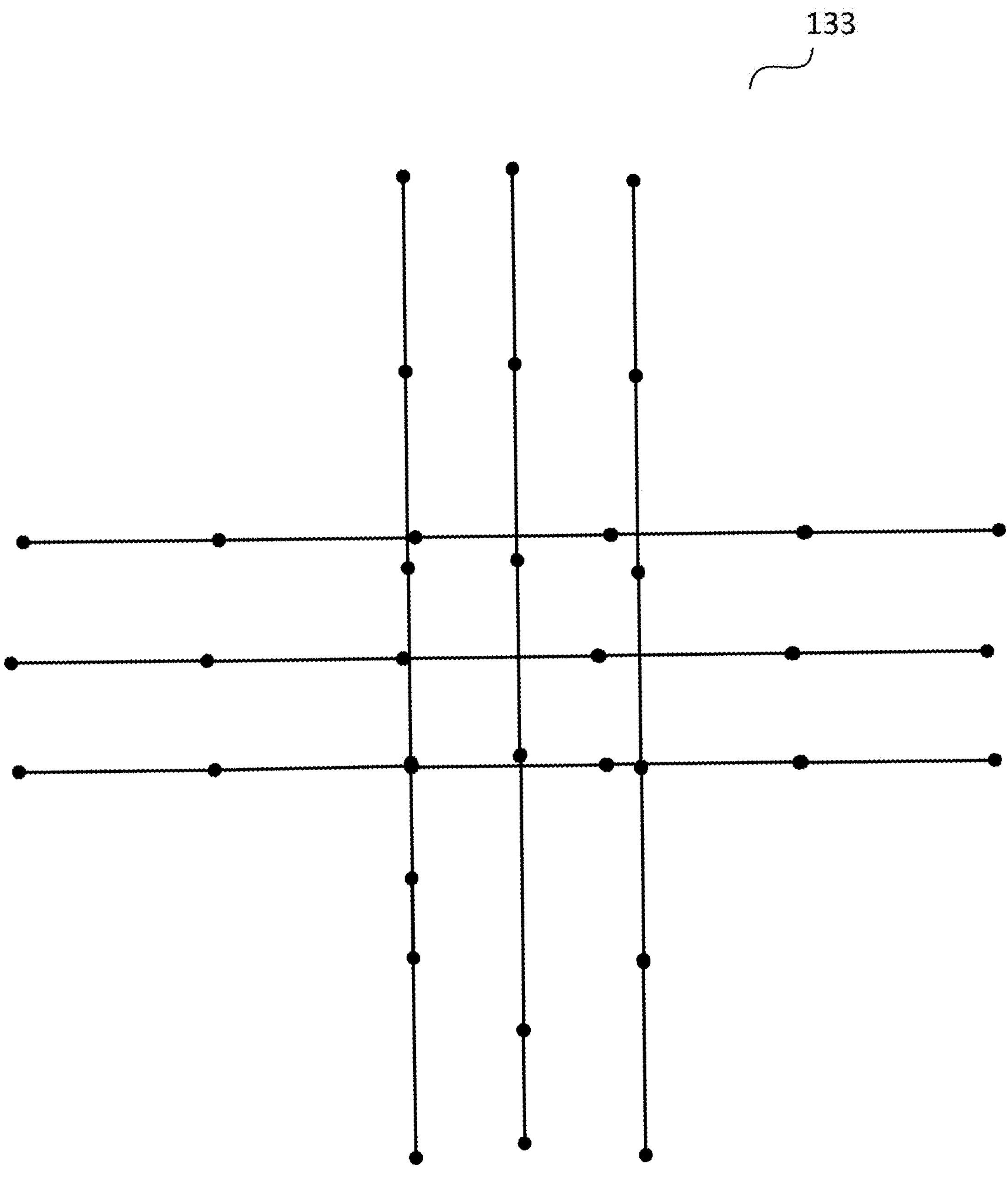
FIG. 5 illustrates lane topology data corresponding to the street intersection of FIG. 1.
Figure 6:
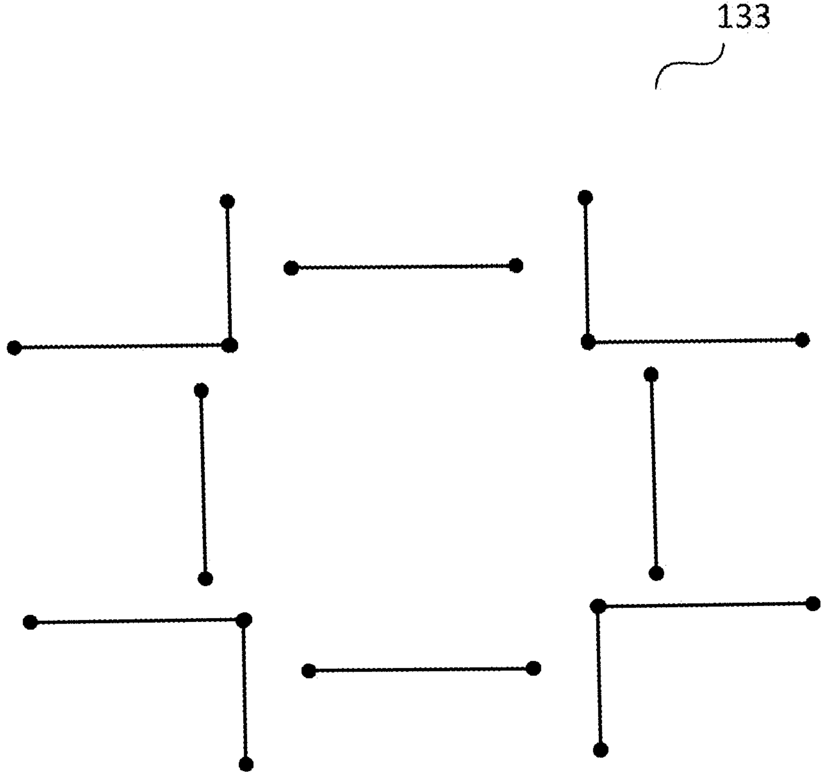
FIG. 6 illustrates sidewalk and crosswalk topology data corresponding to the street intersection of FIG. 1.

FIG. 5 illustrates the lane data 133 defining the topology of the lanes of streets S, according to an example embodiment. Each street S corresponding to the illustrated example embodiment includes three lanes. The line segments represent the lanes and the dots at ends of each line segment define the lanes. It is noted that the environmental model, which is used to perform intelligent intersection functions, does not use a map or map information; instead, the environmental model uses lane topology defined by the lane data 133 (i.e., dots and line segments), crosswalk and sidewalk data 133 having a similar topology as the lane data 133 depicted in FIG. 5, and the raw radar data 135. FIG. 6 illustrates crosswalk and sidewalk data 133 which defines the crosswalk and sidewalk topology, respectively, at the intersection of streets S.

Figure 4:
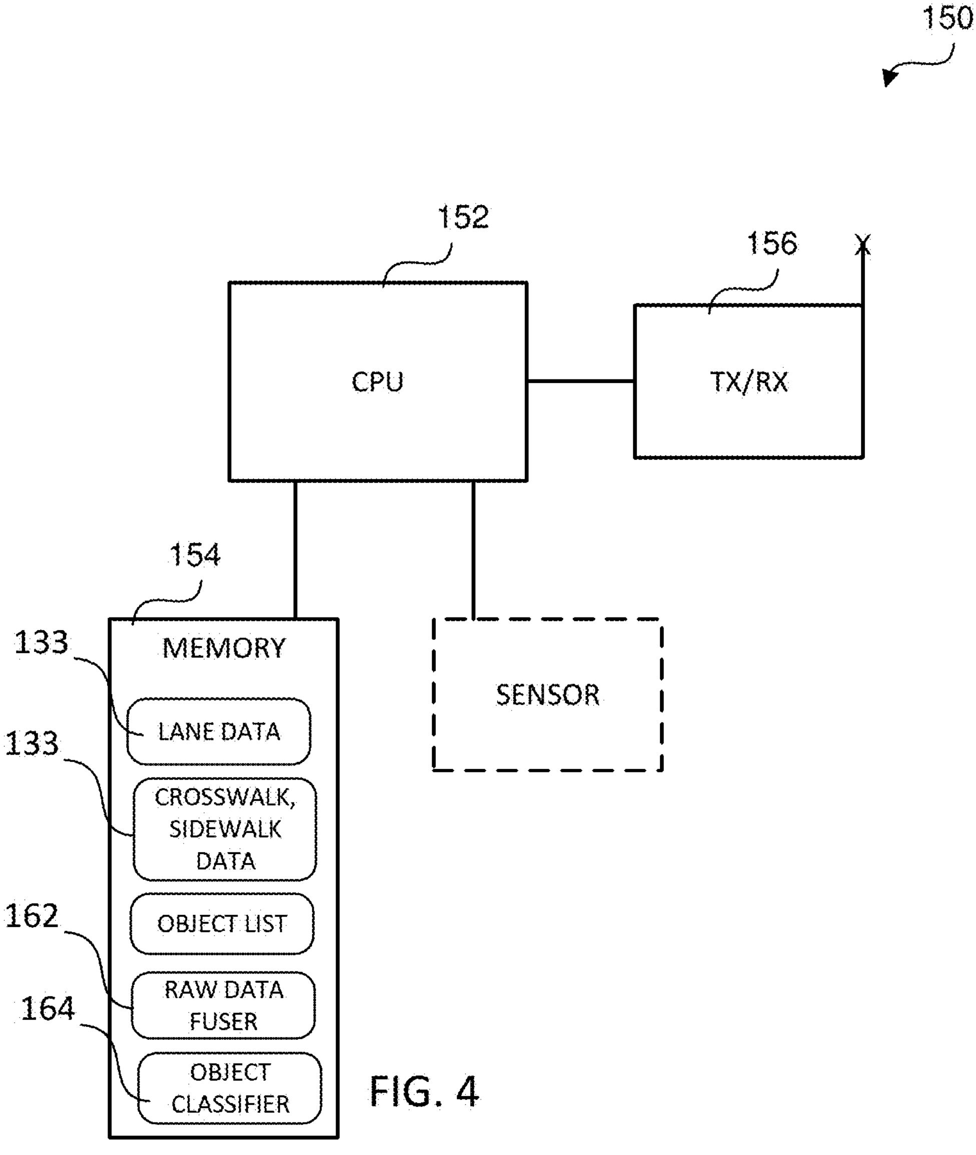
FIG. 4 is a block diagram of a computing device of the intelligent intersection system of FIG. 3.

Referring to FIG. 4, in one implementation the computer 150 includes data processing hardware such as a central processing unit (CPU) 152 and non-transitory memory 154 coupled thereto. In one implementation, the memory 154, which may include volatile and non-volatile memory, stores program code instructions which, when executed by CPU 152, causes CPU 152 to perform one or more intelligent intersection functions or operations. The memory 154 may also maintain data, such as the raw radar data 135 received from radar sensors 1-8 as well as the lane, crosswalk and sidewalk data 133. A transceiver 156 is communicatively coupled to the CPU 152 for transmitting and receiving information over the air interface using any one or more of a number of existing or future wireless communication protocols. In an implementation, transceiver 156 receives the raw radar data 135 from radar sensors 1-8. In addition or in the alternative to communicating with radar sensors 108 over the air interface, the transceiver 156 also transmits and receives information over a hardwired connection using any known or future communication protocol for effectuating communication over the wired connection.

Figure 7:
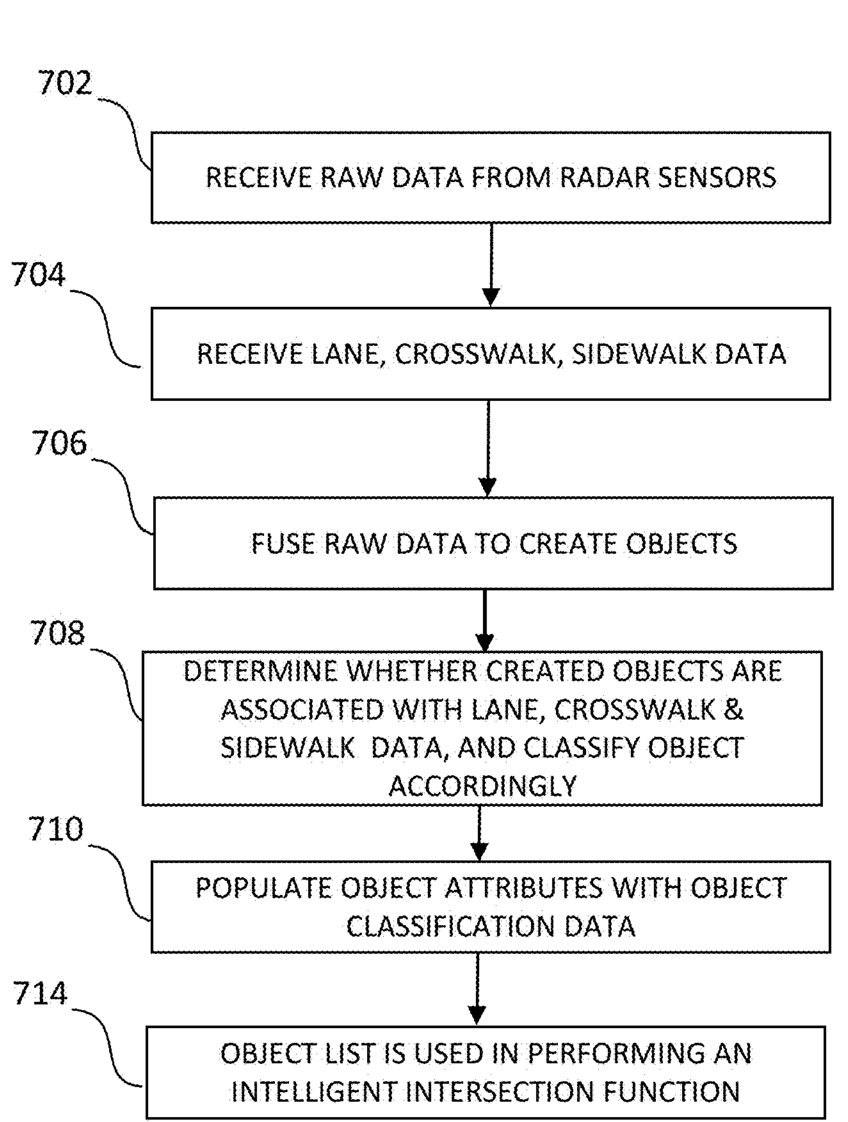
FIG. 7 is a flowchart illustrating an intelligent intersection method, according to an example embodiment.

FIG. 7 illustrates a flowchart of a method 700 for creating an environmental model for use by the intelligent intersection system 10 according to an example embodiment. Initially, the computer 150 receives at 702 the raw radar data 135 from the radar sensors 1-8. The raw radar data 135 may be received over a wired or wireless connection. The computer 150 receives at 704 the lane, crosswalk and sidewalk data 133. The raw radar data received at 702 is fused at 706 which creates the objects sensed in or around the street intersection. This is in contrast to other intelligent intersection systems in which each radar sensor processes its own raw radar data, creating objects, which are then fused to create fused objects. The computer 150 uses the lane, crosswalk and sidewalk data as additional input for classifying the objects, by influencing class probability. The created objects are checked at 708 to see whether they are associated with a lane, crosswalk or sidewalk, based upon the lane, crosswalk and sidewalk data 133, and classified accordingly. For example, if a created object is in a lane, the object has a higher probability to be a vehicle and thus is classified as a vehicle, and a vehicle attribute is added to the object list for that object at 710. If the created object is in a crosswalk or on a sidewalk, the object has a higher probability to be a pedestrian and is thus classified as a pedestrian, and a pedestrian attribute is added to the object list for such object at 710. The object list, now including the objects created at 706 with some listed objects having a vehicle or a pedestrian attribute, serves as the environmental model for use in performing intelligent intersection functions by the intelligent intersection system 10.

Various implementations of the systems and techniques described here may be realized in digital electronic circuitry, integrated circuitry, specially designed ASICS (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification may be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus or CPU. The computer readable medium or memory man be a machine-readable storage device, a machine-readable storage substrate, a memory device, a composition of matter effecting a machine-readable propagated signal, or a combination of one or more of them. The terms "data processing apparatus", "computing device", and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The example embodiments have been described herein in an illustrative manner, and it is to be understood that the terminology which has been used is intended to be in the nature of words of description rather than of limitation. Obviously, many modifications and variations of the invention are possible in light of the above teachings. The description above is merely exemplary in nature and, thus, variations may be made thereto without departing from the spirit and scope of the invention as defined in the appended claims.

What is claimed is:

1. A method of controlling an intelligent intersection system, the method comprising:

receiving image data of a street intersection;

generating based on the image data a first topology of a plurality of lanes in the street intersection and a second topology of at least one crosswalk or at least one sidewalk associated with the street intersection;

determining whether the object is disposed within the first topology or the second topology based on a position of the object; and classifying the object as a vehicle based on determining the object is disposed within the first topology and a pedestrian based on determining the object is disposed within the second topology;

and performing an intelligent intersection function based on classifying the object as the vehicle or the pedestrian model.

2. The method of claim 1, wherein determining whether the object is disposed within the first topology or the second topology comprises:

detecting the object, by a plurality of radar sensors;

fusing radar data of radar reflections from the object received by the plurality of radar sensors;

determining the position of the object based on a result of fusing the radar reflections; and determining whether the position of the object is disposed within the first topology or the second topology.

3. The method of claim 2, further comprising storing the object in an object list that is an environmental model of the intelligent infrastructure system, wherein performing the intelligent infrastructure function comprises performing the intelligent intersection function based on the object list.

4. The method of claim 3, wherein the object list comprises an attribute of the object associated with the object.

5. The method of claim 4, wherein the attribute of the object comprises a classification of the object as the vehicle or a classification of the object as the pedestrian.

6. The method of claim 5, wherein the attribute of the object comprises at least one of a size of the object, a position of the object, a velocity of the object, and a heading of the object.

7. The method of claim 6, wherein the fusing comprises providing raw sensor data of the plurality of radar sensors to one of an extended Kalman filter, a particle filter, a Bayesian network, or a convolutional neural network to create the object.

8. An intelligent intersection system comprising:

a processing unit; and memory coupled to the processing unit, the memory storing program code having instructions which, when executed by the processing unit, cause the processing unit to perform a method comprising:

receiving image data of a street intersection;

generating based on the image data a first topology of a plurality of lanes in the street intersection and a second topology of at least one crosswalk or at least one sidewalk associated with the street intersection;

determining whether the object is disposed within the first topology or the second topology based on a position of the object; and classifying the object as a vehicle based on determining the object is disposed within the first topology and a pedestrian based on determining the object is disposed within the second topology; and performing an intelligent intersection function based on classifying the object as the vehicle or the pedestrian.

9. The intelligent intersection system of claim 8, wherein determining whether the object is disposed within the first topology or the second topology comprises:

detecting the object, by a plurality of radar sensors;

fusing radar data of radar reflections from the object received by the plurality of radar sensors;

determining the position of the object based on a result of fusing the radar reflections; and determining whether the position of the object is disposed within the first topology or the second topology.

10. The intelligent intersection system of claim 9, wherein the method further comprises storing the object in an object list that is an environmental model of the intelligent infrastructure system, wherein performing the intelligent infrastructure function comprises performing the intelligent intersection function based on the object list.

11. The intelligent intersection system of claim 10, wherein the object list comprises an attribute of the object associated with the object.

12. The intelligent intersection system of claim 11, wherein the attribute of the object comprises a classification of the object as the vehicle or a classification of the object as the pedestrian.

13. The intelligent intersection system of claim 12, wherein the attribute of the object comprises at least one of a size of the object, a position of the object, a velocity of the object, and a heading of the object.

14. The intelligent intersection system of claim 13, wherein the fusing comprises providing raw sensor data of the plurality of radar sensors to one of an extended Kalman filter, a particle filter, a Bayesian network, or a convolutional neural network to create the object.

* * * * *